UNITED STATES PATENT OFFICE.

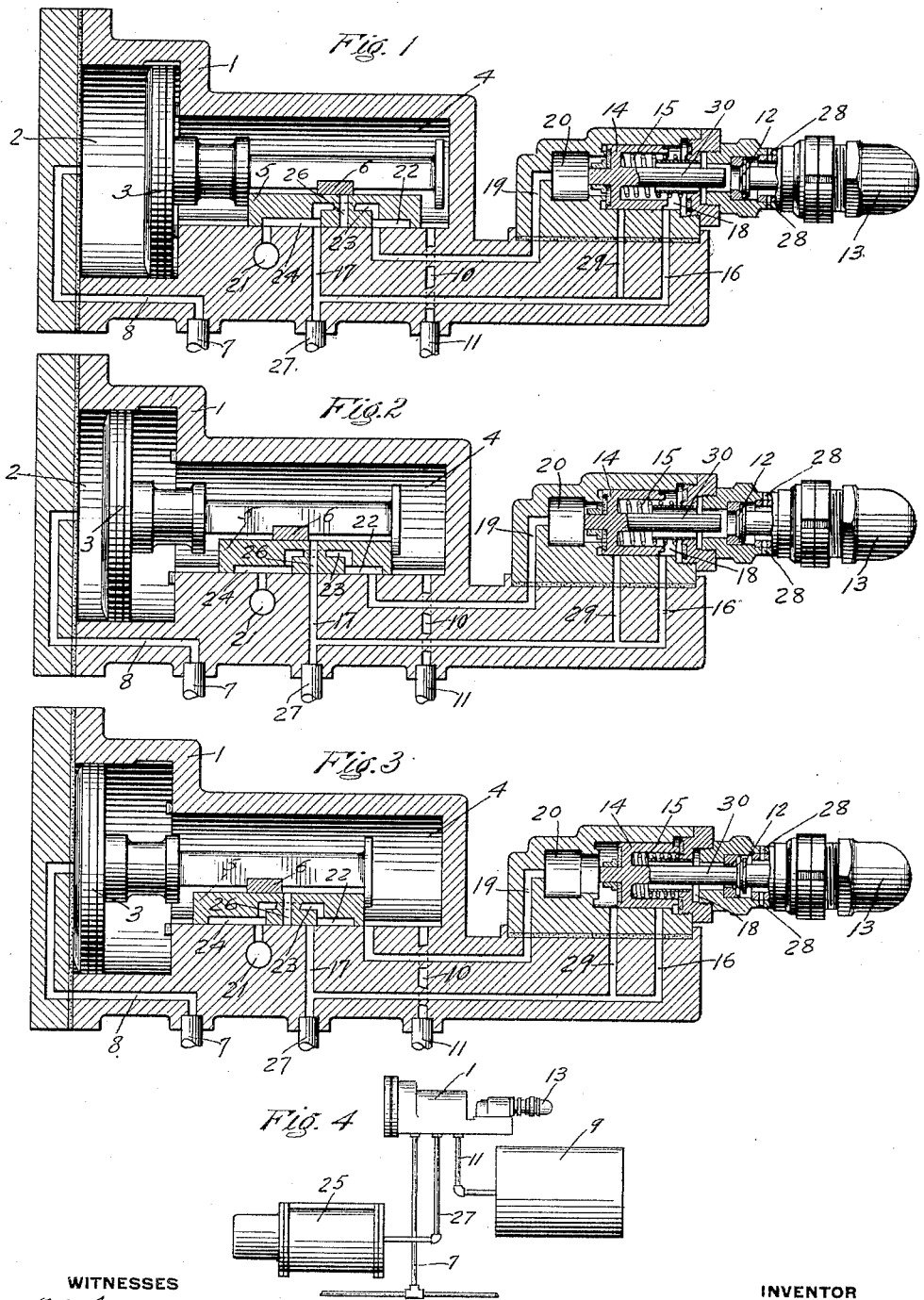

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAFETY-VALVE CUT-OFF DEVICE.

1,099,583. Specification of Letters Patent. Patented June 9, 1914.

Application filed September 23, 1913. Serial No. 791,273.

*To all whom it may concern:*

Be it known that I, WALTER V. TURNER, a citizen of the United States, residing at Edgewood, in the county of Allegheny and State of Pennsylvania, have invented new and useful Improvements in Safety-Valve Cut-Off Devices, of which the following is a specification.

This invention relates to fluid pressure brakes, and more particularly to a cut-off valve device for closing communication from the brake cylinder to the safety valve device in an emergency application of the brakes.

The principal object of my invention is to provide an improved positively acting cut-off valve device of the above character.

In the accompanying drawing, Figure 1 is a central sectional view of a triple valve device and safety valve, showing the improved cut-off valve device applied thereto, the parts being in normal release position; Fig. 2 a similar view, showing the parts in service application position; Fig. 3 a similar view, showing the parts in emergency application position; and Fig. 4 a diagrammatic view of a car air brake equipment, with my improvement applied thereto.

In order to illustrate one application of my invention, a triple valve device is shown, comprising a casing 1 having a piston chamber 2 containing piston 3 and a valve chamber 4 containing main slide valve 5 and graduating valve 6 adapted to be operated by piston 3. Piston chamber 2 is connected to train pipe 7 by passage 8 and valve chamber 4 is connected to auxiliary reservoir 9 through passage 10 and pipe 11.

The safety valve device 13 may be of any desired type having valve 12 adapted to open at a predetermined maximum pressure and vent air from the brake cylinder and the cut-off valve device may comprise a valve piston 14 adapted to seat in opposite directions. A spring 15 acts on said valve piston and tends to normally maintain the same in a position for opening communication from passage 16, which communicates with brake cylinder passage 17, to chamber 18 at one side of the valve piston 14.

In the normal release position of the triple valve device, a passage 19 leading to chamber 20 at the opposite side of said valve piston 14 is connected to exhaust port 21 through cavity 22, port 23 and the usual exhaust cavity 24 in main slide valve 5 and as passage 16 is also open to the exhaust port through the brake cylinder passage 17, the fluid pressures on opposite sides of the valve piston 14 are balanced and the spring 15 therefore maintains the same in open position, as shown in Fig. 1 of the drawing. In service application position, as shown in Fig. 2 of the drawing, the passage 19 is still connected with the exhaust port 21 and fluid supplied to the brake cylinder 25 through port 26, passage 17, and pipe 27 also flows through passage 16 to chamber 18. The valve piston 14 is thus maintained in open position during service applications of the brakes, and fluid under pressure in excess of the degree at which the safety valve is adjusted operates to unseat the valve 12 and escapes through the safety valve relief ports 28. Upon making an emergency reduction in train pipe pressure, the triple valve is shifted to emergency application position, as shown in Fig. 3 of the drawing, and communication is then opened from valve chamber 4 and the auxiliary reservoir to passage 19. The flow of fluid under pressure through passage 19 to chamber 20 operates to shift the valve piston 14 to its outer position, thereby uncovering a passage 29 leading to passage 16. Fluid under pressure is thus supplied to the brake cylinder to effect an emergency application of the brakes. The valve piston 14 is provided with a stem 30 which is adapted to engage the valve 12 and open the same when the valve piston moves to its outer position and thus any fluid leaking around the valve piston to chamber 18 will be vented to the atmosphere through the ports 28. By this means, the building up of fluid pressure in chamber 18 by leakage is prevented, which might otherwise cause the valve piston to be shifted sufficiently to open the passage 16 and thereby permit the blowing down of the brake cylinder pressure in an emergency application of the brakes.

Having now described my invention, what I claim as new and desire to secure by Letters Patent, is:—

1. In a fluid pressure brake, the combination with a brake cylinder, of a safety valve for limiting the brake cylinder pressure in a service application of the brakes, a valve device for cutting off communication from the brake cylinder to said safety valve in an emergency application of the brakes, and means operating upon an emergency application of the brakes for opening a vent port to one side of said valve device.

2. In a fluid pressure brake, the combination with a brake cylinder, of a safety valve for limiting the brake cylinder pressure in a service application of the brakes, a valve device for cutting off communication from the brake cylinder to said safety valve in an emergency application of the brakes, and means operated by the movement of said cut-off valve device in an emergency application of the brakes for unseating the safety valve.

3. In a fluid pressure brake, the combination with a brake cylinder, of a safety valve device for limiting the brake cylinder pressure in a service application of the brakes comprising a valve adapted to open communication from the brake cylinder to an exhaust port at a predetermined degree of fluid pressure, a cut-off valve device operated in an emergency application of the brakes for closing communication from the brake cylinder to said valve and for opening said valve.

4. In a fluid pressure brake, the combination with a brake cylinder, of a valve for relieving the pressure in the brake cylinder above a predetermined degree in a service application of the brakes and a cut-off valve device operated by the flow of fluid to the brake cylinder in an emergency application of the brakes for closing communication from the brake cylinder to said valve and provided with a stem for lifting said valve from its seat to thereby permit the exhaust of fluid on one side of said valve device.

5. In a fluid pressure brake, the combination with a brake cylinder, of a safety valve for limiting the brake cylinder pressure to a predetermined degree in a service application of the brakes, a valve device normally providing communication from the brake cylinder to the safety valve and operating upon an emergency application of the brakes for closing said communication, and a stem operated by said valve device for opening said safety valve to prevent accumulation of fluid under pressure on said valve device.

In testimony whereof I have hereunto set my hand.

WALTER V. TURNER.

Witnesses:
A. M. CLEMENTS,
W. W. MARTIN.